United States Patent
Reutlinger et al.

(10) Patent No.: US 6,335,575 B1
(45) Date of Patent: Jan. 1, 2002

(54) ELECTRICAL VOLTAGE SUPPLY SYSTEM

(75) Inventors: Kurt Reutlinger, Stuttgart; Richard Schoettle, Maulbronn, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/382,409

(22) Filed: Aug. 24, 1999

(30) Foreign Application Priority Data

Aug. 24, 1998 (DE) .............................. 198 38 296

(51) Int. Cl.$^7$ ....................................... H02P 9/26
(52) U.S. Cl. .................. 307/10.1; 307/9.1; 307/10.6; 307/10.7
(58) Field of Search ............... 307/10.1, 17, 45, 307/48, 9.1, 10.6, 10.7; 323/215, 247, 301, 305, 328, 355; 363/126, 254, 129; 322/80, 90, 93, 94, 97

(56) References Cited

U.S. PATENT DOCUMENTS 5,093,583 A * 3/1992 Mashino et al. ............ 307/10.1

FOREIGN PATENT DOCUMENTS

| EP | 0 325 205 | 7/1989 |
| EP | 0 379 357 | 7/1990 |
| EP | 0 740 391 | 10/1996 |

* cited by examiner

Primary Examiner—Fritz Fleming
Assistant Examiner—Robert L. Deberadinis
(74) Attorney, Agent, or Firm—Kenyon & Kenyon

(57) ABSTRACT

An electrical voltage supply system includes an alternator having phase windings, it being possible to connect the alternator to a battery, and which is part of a first vehicle electrical system. The output of the alternator leads via a rectifier bridge and a voltage transformer operating as a step-up transformer to a second vehicle electrical system which has a markedly higher voltage and has usually no battery. To supply voltage to the loads of the vehicle electrical system which is operated at a higher voltage even during a standstill of the alternator, the alternator is then connected to the battery of the vehicle electrical system, and the higher voltage is obtained with the assistance of the step-up transformer, the step-up transformer operating in such a manner that is uses the alternator inductance as a choke.

9 Claims, 2 Drawing Sheets

ELECTRICAL VOLTAGE SUPPLY SYSTEM

FIELD OF THE INVENTION

The present invention relates to an electrical voltage supply system, in particular, in a vehicle electrical system.

BACKGROUND INFORMATION

For generating the electrical energy required in a motor vehicle, usually claw-pole generators are used today. Such claw-pole generators are three-phase alternators whose output voltage is rectified with the assistance of a rectifier bridge. The rectified current is then used for supplying the electric loads of the vehicle as well as for charging the battery. The output voltage of the claw-pole generator is controlled with the assistance of a voltage regulator in such a way that it is approximately constant, independently of the alternator speed. The voltage level which is adjusted is usually selected in such a way that it is optimally suited for charging the battery.

In vehicle electrical systems having a plurality of loads, the problem exists that the voltage of 14V usually supplied by the alternator is not sufficient for the power supply. Since, usually, there are also loads in the vehicle electrical system which need a higher voltage than 12V and 14V respectively, it is known to use alternators which are regulated to a higher voltage than 12V and 14V respectively. Thus, it is suggested, for example, in European Patent Application No. 0 325 205 to regulate the alternator in a vehicle electrical system to 48V, and to derive the usual voltage of the electrical system of 12 and 14V respectively from this higher voltage with the assistance of voltage transformers. As the main battery in this known vehicle electrical system, a high-voltage battery is used which is charged with the assistance of the voltage of 48V supplied by the alternator. To the loads having a lower supply voltage, back-up capacitors can be assigned which stabilize the transformed voltage. The known design approach has the disadvantage that, instead of a conventional battery having a rated voltage of 12V, a battery suited for 48 volts must be used.

SUMMARY OF THE INVENTION

The electrical voltage supply system according to the present invention has the advantage that a conventional 12V-battery can be used as the main battery, that the alternator can be regulated to an output voltage of approximately 14V, and that a higher voltage is made available for the vehicle electrical system. In this manner, it is possible to build up a vehicle electrical system having a higher voltage.

It is particularly advantageous that energy can be drawn from the vehicle electrical system having a higher voltage even when the alternator is at rest. For this purpose, a dc-to-dc converter is provided which transforms the voltage of the battery into a higher voltage. The inductive component which is needed in such a dc-to-dc converter is in a particularly advantageous manner the alternator itself whose phase winding inductances are used as a choke (choke inductors) for the dc-to-dc converter which works as a step-up transformer.

Since it is possible to connect conventional loads of the vehicle electrical system to the battery in the usual manner, the electrical voltage supply system according to the present invention can be used to build up a vehicle electrical system which, in an advantageous manner, is composed of an electrical system having a conventional voltage and an electrical system having a higher voltage. For supplying the conventional loads and the battery, a further alternator can be advantageously used which is regulated to an output voltage of approximately 14V.

The interconnection of the alternator can be adapted to the requirements or conditions in an advantageous manner. The alternator is expediently operated in a star connection in order that the phase winding inductances are usable for the dc-to-dc converter. However, it is also possible to operate the alternator in a delta connection; in this case, additional circuit measures are to be taken. In any case, due to the advantageous arrangement, or rather interconnection of the alternator with the battery of the vehicle electrical system and the loads of the vehicle electrical system having a higher voltage, it is possible to ensure that the loads of the vehicle electrical system are supplied with voltage even when the alternator is at rest. The rectifier bridge of the alternator can, in an advantageous manner, either have a conventional design, in this case, a step-up transformer having to follow; however, the rectifier bridge can also include components of the step-up transformer itself, in this case, individual rectifier elements having to be replaced with field-effect transistor.

In the following, the present invention is described on the basis of a claw-pole generator. In principle, the electrical voltage supply system according to the present invention can be built up using any alternators, i.e., independently of the number of phase winding inductances, alternators being conceivable which have less than three or more than three phase winding inductances.

DETAILED DESCRIPTION

Figure 1:
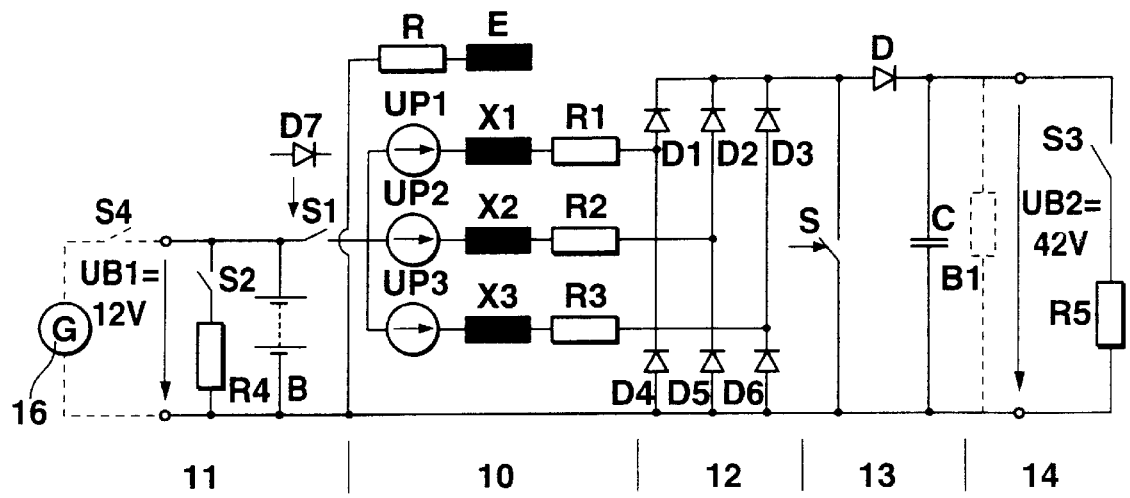
FIG. 1 shows a first embodiment of the system according to the present invention.

FIG. 1 shows a first exemplary embodiment of the present invention. Alternator 10, which is driven by the internal combustion engine, which is not shown, supplies the electrical energy required to supply the 42V-loads of the vehicle electrical system. Alternator 10 is, for example, a claw-pole generator having three phase windings which is regulated to the desired output voltage by a voltage regulator R by regulating the current via field winding E in known manner. Individually shown of alternator 10 are only phase winding inductances X1, X2, and X3 as well as resistances R1, R2, and R3 of the phase windings. The arising phase voltages are referred to by UP1, UP2, and UP3. In the exemplary embodiment according to FIG. 1, the interconnection of the phase windings of alternator 10 is a star connection. The common node of the star connection can be led via switch S1 to 12V-electrical system 11. Of 12V-electrical system 11, only battery B as well as a further switch S2 and a 12V-load R4 are shown. However, the 12V-electrical system includes all loads having a rated voltage of UB1=12V.

Alternator 10 is followed in known method by a rectifier bridge 12 which includes six diodes D1 through D6. Theoretically, it would also be possible to use Zener diodes instead of diodes D1 through D6. A dc-to-dc converter 13 designed as a step-up transformer is connected to rectifier 12, and includes a switch S, a diode D as well as a capacitor C. The higher vehicle electrical system voltage, which, for example, is 42V, can be tapped off at capacitor C. The vehicle electrical system voltage UP2 can be fed via a switch S3 to loads R5. Of 42V-electrical system 14, which usually does not need a battery, only switch S3 and resistance R5 are shown, although this vehicle electrical system can include a plurality of loads, particularly of the kind for which it is desirable to be supplied with a higher voltage.

The exemplary embodiment of an electrical voltage supply system shown in FIG. 1 allows to produce a two-part vehicle electrical system which has a voltage level of 14V and 12V respectively, and a second voltage level of 42V and 36V respectively. In such a vehicle electrical system, conventional loads can be supplied with 12V, and certain loads with 36V. Since only one battery B is used, it must be ensured that the loads of vehicle electrical system 14 are supplied with energy even when the alternator is at rest. This electrical energy is supplied from battery B via alternator 10, and is transformed to the required voltage level with the assistance of voltage transformer 13 which is designed as a step-up transformer.

In order that dc-to-dc converter 13 does not need any additional inductive component, phase winding inductances X1, X2, and X3 of alternator 10 are also used as chokes for the step-up transformer. For that purpose, alternator 10 is star-connected.

Using the embodiment of the electrical voltage supply system according to the present invention shown in FIG. 1, a voltage supply in the 42V-electrical system can be ensured during a standstill of the alternator and at low speeds, while the alternator cannot supply power yet, by closing switch S1. Thus, voltage transformer 13 is connected to battery B, and the voltage transformer at the output of the alternator can draw the required power from battery B with the assistance of the alternator inductance of battery B, and feed it to the vehicle electrical system having a higher voltage level 14. Switch S of voltage transformer 13 is needed for that purpose in known manner; the control of switch S is taken, for example, by the voltage regulator. When the alternator begins to turn, it generates a voltage. This voltage superimposes upon the battery voltage at star (neutral) point SP. The load power of 42V-electrical system 14 is then partially supplied by the battery and partially by the alternator. When the alternator, due to the increased speed, is able to cover the full power input of the 42V-system, the connection between battery B and star point SP is interrupted by opening switch S1. Switch S1 can be designed as a mechanical switch or as an electronic valve.

A diode D7 can be used instead of switch S1. When the alternator phase voltage UP1, UP2, UP3 exceeds the rated voltage of the battery, for example, 12V, then the diode blocks. Then, the battery no longer supplies power via star point SP of the alternator to 42V-electrical system 14. In this case, both systems are decoupled by diode D7.

When the alternator phase voltage UP1, UP2, UP3, due to decreasing alternator speed, falls below 12V again, then energy is supplied to the 42V-electrical system via diode 7 again. Thus, the voltage at the input of voltage transformer 13, designed as a step-up transformer, does not fall below the battery voltage less the diode voltages. In this manner, it is ensured that the input voltage of the voltage transformer has always a value which guarantees a reliable operation of the voltage transformer.

Usually, capacitor C of voltage transformer 13 is used for smoothing the voltage transformed in the step-up transformer. Instead of capacitor C, a further battery B1 can also be connected in parallel, which, however, is not absolutely required for the functioning method of an electrical voltage supply system.

Figure 2:
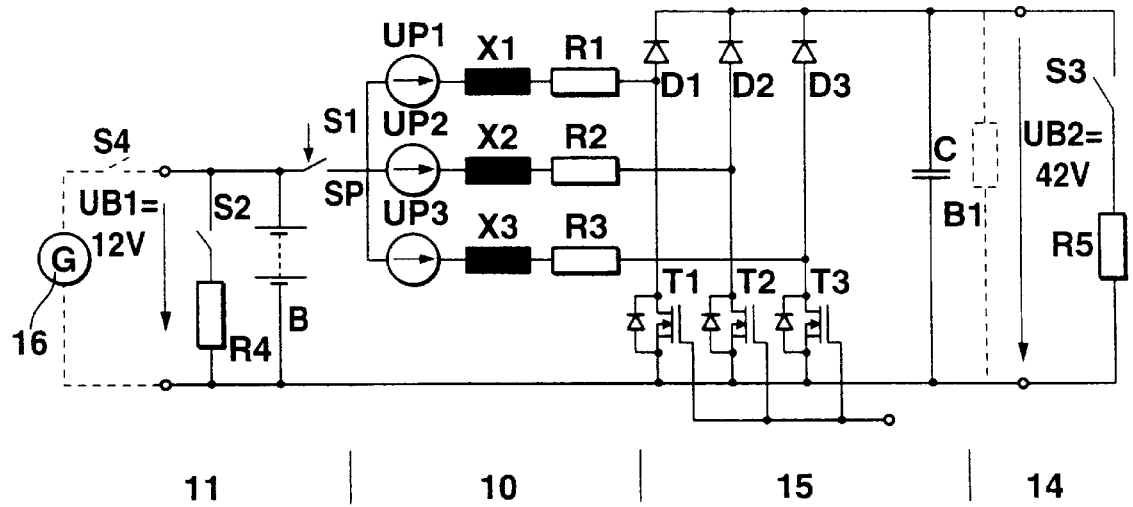
FIG. 2 shows a second embodiment of the system according to the present invention.

FIG. 2 shows a further exemplary embodiment of the present invention which has a better efficiency compared to the exemplary embodiment shown in FIG. 1 since the current supplied by the alternator no longer has to be conducted via three power semiconductors but only via two. In contrast to the exemplary embodiment according to FIG. 1, the exemplary embodiment according to FIG. 2 does not have a separated design of rectifier and voltage transformer (step-up transformer) but the rectifier and the step-up transformer are combined in a rectifier plus step-up transformer 15. To this end, the lower three diodes D4, D5, and D6 of the exemplary embodiment according to FIG. 1 are replaced with three switching elements, for example, MOS field-effect transistors T1, T2, and T3. These three switches are controlled parallelly, and, in this manner, attain the same effect as switch S of step-up transformer 13 according to FIG. 1. By the joint control, a simple control method is retained. Diode D of the step-up transformer according to FIG. 1 can be dropped since its function is taken over by the upper three diodes D1, D2, and D3 of the rectifier. The control of transistors T1, T2, and T3 can be carried out by the control section of the voltage regulator which controls the output voltage of the alternator; however, the control can also come from a different control unit of the vehicle.

When the three switches are closed, i.e., when the three MOS field-effect transistors T1, T2, and T3 are triggered (driven), then the alternator is short-circuited. The inductance of the alternator, or rather, the individual inductances X1, X2, and X3 are then charged with magnetic energy. When the switches are reopened, the magnetically stored energy is fed via upper rectifier diodes D1, D2, and D3 into 42V-electrical system 14. Thus, the alternator inductance indeed acts as a choke of the step-up converter. The MOS field-effect transistors T1, T2, and T3 can also be replaced with other appropriate switching elements which make it possible to interrupt or short-circuit the alternator.

Figure 3:
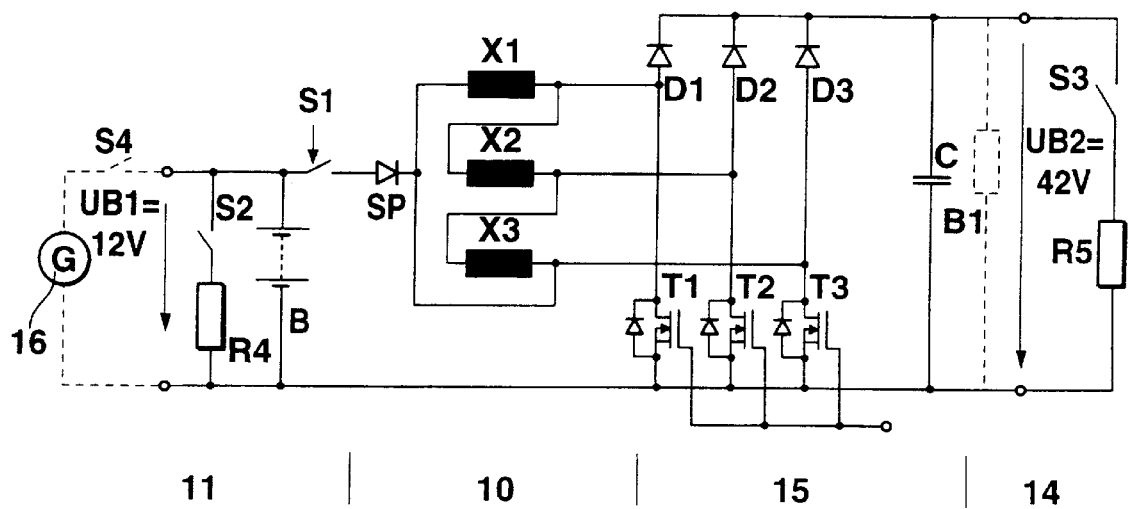
FIG. 3 shows a third embodiment of the system according to the present invention.

FIG. 3 shows a third exemplary embodiment of the present invention which differs from the exemplary embodiment of FIG. 2 only in that alternator 10 is not star-connected but connected in delta. Additionally, a diode SP is located between switch S1 and alternator 10. The control of switches T1 through T3 differs from the control in the exemplary embodiment according to FIG. 2.

Using the electrical voltage supply system shown in FIG. 3, the 42V-electrical system can also be supplied from the 12V-electrical system during a standstill of the alternator. To this end, the inductance of the alternator is also used for a step-up transformer operation. As long as battery B feeds into the step-up transformer, i.e., while switch S1 is closed and the alternator speed is not yet sufficient for the alternator to supply a voltage which is higher than the battery voltage, switch T3 must not be triggered. This switch, or rather field-effect transistor T3 connects to the outer conductor which is connected to the battery. If field-effect transistor T3 were triggered, a short circuit would result on the 12V-side. When the alternator reaches a speed which is sufficient to supply the 42V-side from the alternator, then switch S1 must be opened, and the 12V-side be disconnected from the alternator. Switch T3 can then also be triggered. Then, the further operation corresponds to the process described for the exemplary embodiment according to FIG. 1. Then, the control of the switches can be carried out with the assistance of the voltage regulator.

The exemplary embodiments shown in FIGS. 1, 2 and 3 can be used, for example, in a two-voltage vehicle electrical system in which conventional vehicle electrical system 11 having a rated voltage of UB1=12V includes an alternator 16 which can charge battery B via a switch S4. In a specific application, loads R5 of the 42V-vehicle electrical system without battery are electromagnetic valve-timing gears which have a considerable power demand. In this context, in the usual operation, conventional 14V-alternator 16 is used to charge the battery and to supply vehicle electrical system 11; 42V-alternator 10 is used to supply the electromagnetic valve timing. Such an alternator having a step-up transformer arranged downstream can generate the required voltage of 42V also at low speeds. In this context, the step-up transformer is no longer active at higher speeds. Then, the no-load voltage of the alternator is higher than 42V, and the alternator can feed directly into the 42V-electrical system. During the starting operation of the internal combustion engine, the 42V-alternator does not have an output voltage yet because of the low speed. However, since the electromagnetic valve-timing gears need energy for actuating the valves already during the starting operation, it is essential that the 42V system can supply energy already during the start so that the valve control can be carried out immediately after the start.

What is claimed is:

1. An electrical voltage supply system comprising:
   a plurality of rectifying elements;
   a voltage transformer; and
   a three-phase alternator having a plurality of phase windings, each of the plurality of phase windings having a first side and a second side, the first sides of the plurality of phase windings being coupled to a battery, the second sides of the plurality of phase windings being respectively coupled to respective ones of the plurality of rectifying elements, the alternator being coupled to first loads via the plurality of rectifying elements and the voltage transformer.

2. The system according to claim 1, further comprising:
   a first vehicle electrical system, the first vehicle electrical system including the battery, the battery having a rated voltage, the first vehicle electrical system having a second load; and
   a second vehicle electrical system including the first loads, the first loads being coupled to the voltage transformer, the second vehicle electrical system having a voltage which is higher than the rated voltage of the battery.

3. The system according to claim 2, wherein the rated voltage is 12V, the first vehicle electrical system has a charging voltage of 14V, and the voltage of the second vehicle electrical system is 42V.

4. The system according to claim 2, wherein the second vehicle electrical system does not have a separate battery.

5. The system according to claim 2, wherein the first vehicle electrical system includes a separate alternator, the separate alternator being connected to the battery and the second load for supplying the battery and the second load.

6. The system according to claim 1, wherein the voltage transformer is designed as a step-up converter and includes a switch coupled in parallel with the plurality of rectifying elements, further comprising a series connection of a diode and a capacitor coupled in parallel to the switch and to the plurality of rectifying elements, and wherein the alternator has a plurality of phase-winding inductors as chokes.

7. The system according to claim 1, further comprising a switch between a star point and the battery, the switch being closed provided that a voltage of the alternator is lower than a voltage of the battery, the switch being reopened when a synchronous generated voltage induced in the alternator becomes higher than the battery voltage.

8. The system according to claim 1, wherein there are three windings, and
   wherein the plurality of rectifying elements comprise three branches, and
   wherein each branch of the three branches comprises a diode and a controllable switching element in a series connection, and
   wherein each second side of the three phase windings is respectively coupled between the diode and the switching element of another one of the three branches, and
   wherein the three controllable switching elements are driven in parallel and assume a function of a step-up converter switch, and
   wherein each of the switching elements includes a MOS field-effect transistor.

9. The system according to claim 8, wherein the battery is coupled to the three phase windings via a switch, the switch having a closed position, and
   wherein the alternator is connected in delta, and
   wherein one switching element of one branch of the three branches is not triggered when the switch is in the closed position.

* * * * *